United States Patent
Lee et al.

(10) Patent No.: US 10,263,954 B2
(45) Date of Patent: Apr. 16, 2019

(54) IDENTIFYING THE SOURCE AND DESTINATION SITES FOR A VOIP CALL WITH DYNAMIC-IP ADDRESS END POINTS

(71) Applicant: AT&T Intellectual Property I, L.P., Atlanta, GA (US)

(72) Inventors: Herman H. Lee, Morganville, NJ (US); Angelo Napoli, Princeton, NJ (US); Chin-Wang Chao, Lincroft, NJ (US); Himali Patel, Avenel, NJ (US); Yean-Ming Huang, Lincroft, NJ (US); Melody Shaw, East Brunswick, NJ (US)

(73) Assignee: AT&T INTELLECTUAL PROPERTY I, L.P, Atlanta, GA (US)

( * ) Notice: Subject to any disclaimer, the term of this patent is extended or adjusted under 35 U.S.C. 154(b) by 342 days.

(21) Appl. No.: 15/185,469

(22) Filed: Jun. 17, 2016

(65) Prior Publication Data

US 2017/0366503 A1     Dec. 21, 2017

(51) Int. Cl.
| | |
|---|---|
| *H04L 29/12* | (2006.01) |
| *H04L 12/24* | (2006.01) |
| *H04L 29/06* | (2006.01) |
| *H04M 3/22* | (2006.01) |

(Continued)

(52) U.S. Cl.
CPC ...... *H04L 61/6059* (2013.01); *H04L 65/1036* (2013.01); *H04L 65/1069* (2013.01); *H04M 3/2218* (2013.01); *H04M 3/2227* (2013.01); *H04M 15/41* (2013.01); *H04M 15/56* (2013.01);

(Continued)

(58) Field of Classification Search
None
See application file for complete search history.

(56) References Cited

U.S. PATENT DOCUMENTS

| | | |
|---|---|---|
| 7,181,401 B2 | 2/2007 | Johnson et al. |
| 7,904,056 B2 | 2/2011 | Speranza |
| 8,228,901 B2 | 7/2012 | Meranchik |

(Continued)

FOREIGN PATENT DOCUMENTS

| | | |
|---|---|---|
| CA | 2548943 A1 | 5/2006 |
| CA | 2851487 A1 | 11/2014 |

(Continued)

OTHER PUBLICATIONS

"Internet Protocol Version 6 (IPv6)," CISCO, cisco.com, Release 8.5(1), accessed: Jan. 2016. http://www.cisco.com/c/en/usitd/docs/voice_ip_comm/cucm/admin/8_5_1/ccmfeat/fsgd-851-cm/fsipv6.html.

(Continued)

*Primary Examiner* — Philip J Chea
*Assistant Examiner* — Hassan A Khan

(57) ABSTRACT

In a voice-over-IP communications network, call data records include dynamically assigned IP signaling addresses such as IPv6 signaling addresses used in provisioning communications sessions. Those dynamically assigned IP signaling addresses are computed from customer site identification codes using a reversible algorithm. The algorithm can then be reversed to compute a customer site identification code from an IP signaling address contained in a call data record, allowing the communications network provider to perform quality monitoring and diagnostics based on call data records.

16 Claims, 3 Drawing Sheets

(51) Int. Cl.
*H04M 15/00* (2006.01)
*H04M 7/00* (2006.01)

(52) U.S. Cl.
CPC ...... *H04L 61/2007* (2013.01); *H04L 61/6004* (2013.01); *H04M 7/006* (2013.01)

(56) References Cited

U.S. PATENT DOCUMENTS

| | | | |
|---|---|---|---|
| 8,290,137 B2 | 10/2012 | Yurchenko et al. | |
| 8,401,003 B1 | 3/2013 | Petit-Huguenin et al. | |
| 8,509,218 B2 | 8/2013 | Bhatia et al. | |
| 8,620,257 B2 | 12/2013 | Qiu et al. | |
| 8,693,347 B2 | 4/2014 | Elliott et al. | |
| 8,743,870 B2 | 6/2014 | Ramachandran et al. | |
| 8,767,716 B2 | 7/2014 | Trabelsi et al. | |
| 8,780,895 B1 | 7/2014 | McLaughlin et al. | |
| 8,804,702 B2 | 8/2014 | Meranchik | |
| 8,924,574 B2 | 12/2014 | Alex et al. | |
| 8,982,871 B2 | 3/2015 | Ray et al. | |
| 9,036,626 B2 | 5/2015 | Livingood | |
| 9,060,067 B2 | 6/2015 | Clark et al. | |
| 2002/0196788 A1* | 12/2002 | An | H04L 29/12009 370/395.52 |
| 2004/0098504 A1* | 5/2004 | Ueno | H04L 12/2803 709/238 |
| 2004/0205246 A1* | 10/2004 | Park | H04L 12/2809 709/245 |
| 2005/0059409 A1* | 3/2005 | Vare | H04W 4/02 455/456.1 |
| 2005/0094623 A1* | 5/2005 | D'Eletto | H04L 29/06027 370/352 |
| 2008/0200143 A1* | 8/2008 | Qiu | H04M 1/2535 455/404.2 |
| 2010/0172251 A1* | 7/2010 | Adam | H04L 41/12 370/252 |
| 2011/0188493 A1 | 8/2011 | Johnson et al. | |
| 2012/0207168 A1* | 8/2012 | Kassi Lahlou | H04L 29/12358 370/392 |
| 2013/0305044 A1* | 11/2013 | Gutt | H04L 45/00 713/160 |
| 2014/0293996 A1* | 10/2014 | Livingood | H04L 41/12 370/352 |
| 2015/0134851 A1* | 5/2015 | Relan | H04L 45/126 709/241 |
| 2016/0094669 A1* | 3/2016 | Karampurwala | H04L 67/18 370/328 |

FOREIGN PATENT DOCUMENTS

| | | |
|---|---|---|
| JP | 2011091661 A | 5/2011 |
| WO | 2014207712 A1 | 12/2014 |

OTHER PUBLICATIONS

"PacketTrap RMM: VoIP Monitoring Services," packetTrap, packettrap. com, 2012. http://www.packettrap.com/Portals/70471/collateral/packettraprmm_ds_avayavoip_web.pdf.

Sripanidkulchai, Kunwadee, Zon-Yin Shae, and Debanjan Saha, "Call routing management in enterprise VoIP networks," Proceedings of the 2007 SIGCOMM workshop on Internet network management, ACM, 2007.

* cited by examiner

IDENTIFYING THE SOURCE AND DESTINATION SITES FOR A VOIP CALL WITH DYNAMIC-IP ADDRESS END POINTS

TECHNICAL FIELD

Embodiments of the present disclosure relate to voice-over internet protocol (VoIP) communications sessions having end points defined by dynamic IP addresses. Specifically, the disclosure relates to capturing call data records identifying the physical source and destination sites useful in call diagnostics and quality monitoring.

BACKGROUND

A call data record (CDR) is a data record produced by communications equipment that documents the details of a call or other communications transaction passing through the equipment. The record contains attributes of the call, such as time, duration, call quality, call statistics, completion status, originating point, and destination point. CDRs are used by VoIP service providers to analyze and monitor call quality and statistics, and to take service assurance measures.

To create a CDR for a given call, a VoIP service provider must rely on the unique internet protocol (IP) address of the end point to uniquely identify the customer, and his/her location. With the shortage of IPv4 public addresses for end devices, the service provider is now moving away from fixed IP addresses, instead using dynamic IP address assignment for each VoIP call session. One challenge of that new approach is identifying the customer's calling or called site/location when each VoIP call has changing and dynamic IP addresses at the source and the destination.

One approach used by VoIP service providers is to capture the telephone number assigned to each customer end device and use that number as a search key to identify the associated customer site ID. For business call services, however, many intra-office calls at the local branch use 4-digit or 6-digit local numbers for direct dialing. The 4-digit or 6-digit direct dialing numbers captured in the resulting CDR are unique only at the local branch, and not across branches or companies. As a result, using telephone numbers captured in the CDR requires extra logic to uniquely identify calling and called parties and associated customer site IDs in a business service call with direct dialing features.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

Figure 1:
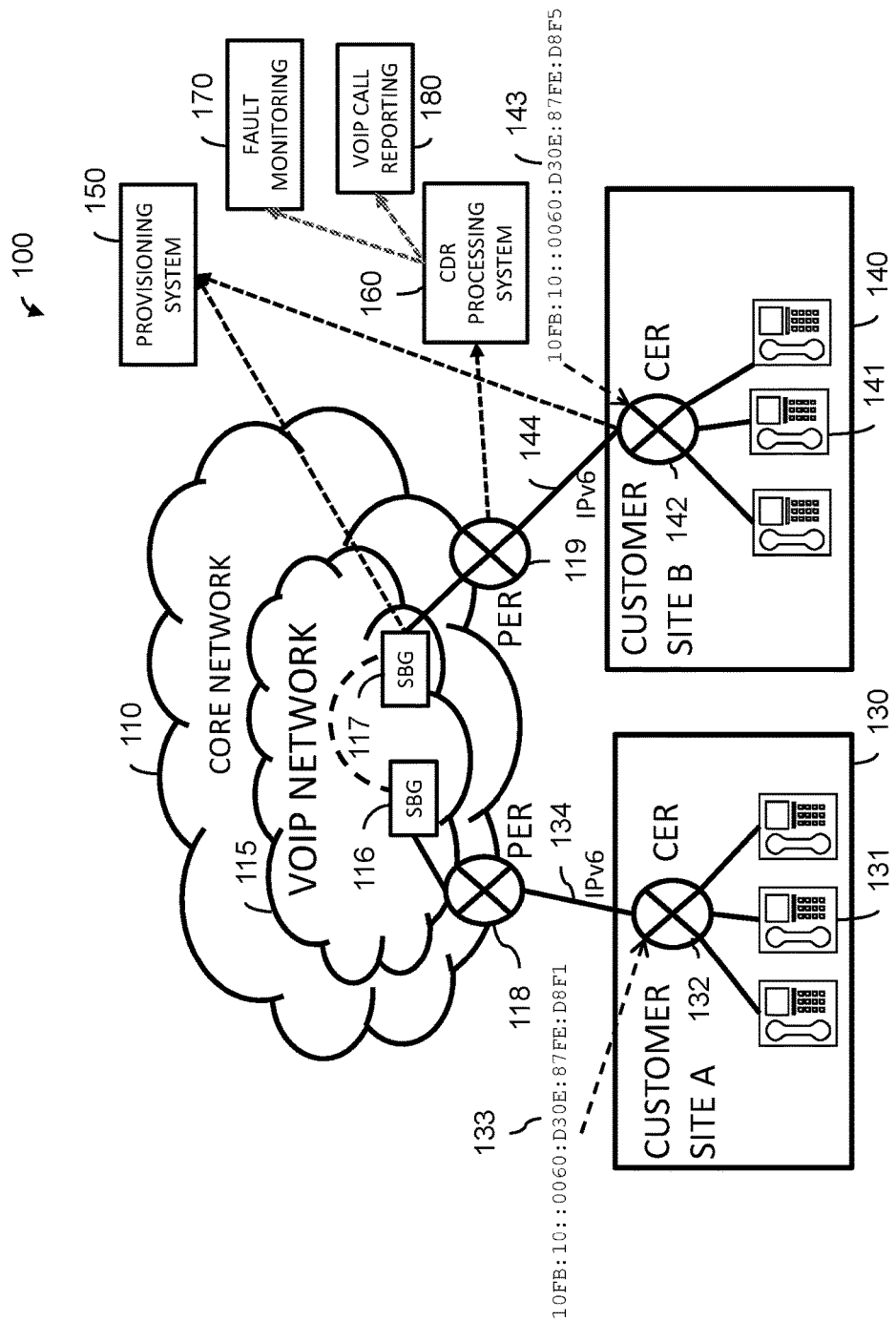
FIG. 1 is a network block diagram of a communications network according to aspects of the present disclosure.

Presently disclosed is a method and network architecture for uniquely identifying the source and destination sites in CDRs for VoIP calls with dynamic IP address end points. In such calls, the end devices have different IP addresses assigned by the service provider for different call sessions.

Embodiments of the present disclosure include a voice-over-IP communications network comprising a plurality of session border gateways, each session border gateway connected to a customer edge router of a customer site assigned an IPv6 signaling address, the IPv6 signaling address containing information uniquely and independently identifying the customer site without reference to a lookup table.

Further embodiments of the disclosure include a method for provisioning a link between a session border gateway and a customer gateway router in a voice-over-IP communications network. A unique identifier is received, identifying a customer site at which the customer gateway router is located. An IP signaling address is then computed from the unique identifier of the customer site using a reversible algorithm. The session border gateway and the customer edge router are set up with the IP signaling address.

Other embodiments of the disclosure include a method for generating call data for a call made in a voice-over-IP communications network. A unique identifier is determined for a voice-over-IP customer site. A signaling address is computed from the unique identifier using a reversible algorithm. A link is provisioned between a session border gateway of the voice-over-IP communications network and a customer gateway router at the voice-over-IP customer site using the signaling address. A call data record is then received for a call placed over the link, the call data record including the signaling address. The unique identifier for the voice-over-IP customer site is then determined by applying an inverse of the reversible algorithm to the signaling address.

The disclosed technique leverages the fact that most call quality and calling problems are associated with customer sites rather than with the individual user end devices. For example, daily, weekly, and monthly reports on call quality are based on specific customer sites or locations for incoming/outgoing calls. When a customer site or location has a consistent or recurring call quality problem or calling problem, it is usually a symptom of a possible bad connection or a bandwidth problem that requires trouble-shooting or field services dispatched to the particular customer location to fix the problem.

A VoIP network services provider typically identifies each customer site with a unique customer site identification number or code in the service provider's provisioning database. The code is typically generated by the service provider's provisioning system. In the examples used in the present disclosure, customer sites are identified in the provisioning database by a unique 9-digit decimal number. One skilled in the art will recognize that other identifier formats may be used for the customer site identification code while remaining within the scope of the present disclosure, including alphanumeric codes, binary and hexadecimal codes, etc.

Each incoming or outgoing call session at a particular customer location uses a unique IP address such as an IPv6 signaling IP address for routing the VoIP call to or from the gateway router at the customer location. That IP address is included in the call record. As noted above, the industry is moving toward assigning that IP address dynamically during set-up of the VoIP call. For that reason, an assigned IP address contained in the call record, without more, is not an indicator of the call origination or destination.

The presently described technique places information identifying the origination or destination customer site within the provisioned IP address in a way that can later be recovered using a simple algorithm, without the use of lookup tables. Specifically, each VoIP customer site is assigned a unique public signaling IP address to a primary/backup session border gateway (SBG) in the provider network, where that public signaling IP address contains information identifying the customer site. To do that, the provisioning system generates a unique public IP signaling address for each VoIP site based on the customer site identification code. That IP signaling address is assigned to a primary/backup SBG for each site by the provisioning system.

In the following, example algorithms are presented for converting a customer site identification code to an IP signaling address, and vice versa. In the example algorithms, the customer site identification code is a 9-digit decimal number generated by the VoIP provisioning system, and the IP address an IPv6 signaling address. One skilled in the art will recognize that other customer site identification code formats, IP address formats and conversion algorithms may be used without departing from the scope or spirit of the disclosure.

In preferred embodiments, the algorithms are simple, portable algorithms that may be performed without access to a lookup table or network database. In that way, the algorithms may be incorporated into the provisioning and call data record generation processes without encumbering those processes with complex or time consuming functions. For example, the algorithms may be limited to string operations and translations between numbers having different bases, such as between decimal and hexadecimal.

The following is a sample algorithm for converting a 9-digit customer site identification code to an IPv6 signaling address according to embodiments of the disclosure. As noted, the identification code is generated by the VoIP provisioning system. In embodiments, the VoIP design platform will prepend a leading '0' and store the identification code in a provisioning database. The 9-digit customer site identification code is initially translated to an IEEE 802 extended unique identifier (EUI)-64 bit format, comprising an organizationally unique identifier (OUI) (24 bits) and a customer identifier (CID) (40 bits). That operation may include three steps. First, the decimal 9-digit customer site identification code is translated into an 8-digit hexadecimal number. For example, the 9-digit customer site identification code 243783921 translates to hex 0E87D8F1. Second, "FE" is inserted into the mid of the 8-digit hexadecimal number to get a 40 bit CID. In the example, that step yields the 40 bit number 0E:87:FE:D8:F1. Third, a 24 bit OUI assigned to the network service provider is prepended to the 40 BIT CID. For example, the OUI 0060:D3 is prepended to yield the IEEE 802 EUI-64 0060:D30E:87FE:D8F1.

The IPv6 prefix and Trinity Subnet ID of the network service provider is then prepended to the EUI-64 address. For example 10FB:0010:: may be prepended to the above EUI-64 address to yield 10FB:0010::0060:D30E:87FE:D8F1. That resulting string is a unique IPv6 address which is unique for all customer sites.

The above-described exemplary algorithm may be performed during provisioning of a call by a VoIP services provider without unduly burdening the computational resources of the provider, and without requiring access to lookup tables or databases.

A second algorithm is used in the disclosed technique to convert the IP signaling address contained in a call record to the network provider's customer site identification code associated with the site where the call originated or terminated. The second algorithm reverses the first algorithm, and similarly is computationally simple. For example, the second algorithm, like the first, may be limited to string operations and translation between numbers having different bases, such as between decimal and hexadecimal.

An exemplary second algorithm according to the present disclosure is used to determine a customer a 9-digit customer site identification code from an IPv6 signaling address contained in a call data record. The first 64 bits of the signaling address (i.e., the IPv6 prefix and Trinity Subnet ID of the network service provider) is first removed from the IPv6 address, yielding the IEEE802 EU-64 format string. For example, the network provider's IPv6 network prefix 10FB:0010:: is removed from the generated IPv6 address 10FB:0010:0000:0000:0060:D30E:87FE:D8F1 to yield the IEEE 802 EUI-64 address 0060:D30E:87FE:D8F1.

The first 24 bits of the IEEE 802 EUI-64 address (i.e., the 24 bit OUI assigned to the network service provider) are then removed from the IEEE802 EUI-64 format string to produce a 40 bit CID string. For example, the first 24 bits are removed from 0060:D30E:87FE:D8F1, yielding 0E87FED8F1.

The 16th bit through 23rd are removed from the 40 bit CID string to yield a 32 bit string. For example, removing the 16th bit through the 23rd bit from the 40 string, 0E87FED8F1 produces the 32 bit string, 0E87DBF1. That 32 bit hexadecimal bit string is translated into a base-10 or decimal format, which corresponds to the 9-digit customer site identification code originally used by the first algorithm to produce the IPv6 signaling address. In the example, the 32 bit string 0E87DBF1 is translated into the decimal string 243783921, identifying the call originating or terminating customer site.

A system 100 in accordance with the disclosure is now described with reference to FIG. 1. A network services provider core network 110 includes a VoIP network 115 for providing the delivery of voice communications, multimedia sessions and other communications sessions over IP networks such as the Internet. Session border gateways (SBGs) 116, 117 are carrier-class session border controllers (SBCs) in the VoIP network 115 for accessing and interconnecting IP multimedia networks. In setting up a VoIP call session, one of the SBGs 116, 117 is connected through a provider edge router (PER) 118, 119 to a customer edge router (CER) or customer gateway router 132, 142 located at a customer site 130, 140. The CERs 132, 142 connect to IP phones or other customer premises equipment 131, 141 at the customer sites.

The connections 134, 144 to the CERs 132, 142 for the originating and terminating customer sites are established using IPv6 signaling addresses 133, 143 that are dynamically provisioned by the provisioning system 150 of the VoIP network 115. Those IPv6 signaling addresses 133, 143 are recorded in the call data records associated with the provisioned VoIP sessions. Because those signaling addresses are dynamically assigned, however, they would not, without more, reveal the actual customer sites 130, 140 that are the originating and terminating locations of the VoIP session.

The presently disclosed system and method add originating and/or terminating location information to the call data record by provisioning IP signaling addresses from which a customer site location may be determined using a simple algorithm. To set up a VoIP session, the VoIP provisioning system 150 initially converts a customer site identification code of an originating or terminating customer site to an IP signaling address. For example, a 9-digit decimal customer site identification code used by the network services provider to identify customer site 140 may be converted to a 128-bit IPv6 signaling address 143 using an algorithm such as the one described above. The provisioning system 150 then sets up a SBG 117 and CER 142 with the IPv6 signaling address 143.

A call data record (CDR) processing system 160 captures the CDR for each call session from the PER 119 or from another router in the core network 110. The CDR may contain the provisioned IP signaling address for the originating customer site CER, the terminating customer CER, or both.

The CDR processing system 160 converts the IPv6 signaling IP address 143 to a customer site identification code that is useable by the network services provider, and stores the customer site identification code with the CDR record. For example, the 128-bit IPv6 signaling address 143 may be converted to a 9-digit decimal customer site identifier useable by the network services provider using an algorithm such as the one described above. The CDR is thereby associated with at least one customer site.

A fault monitoring system 170 of the network services provider receives the CDRs and associated customer site identifiers from the CDR processing system 160 and uses that information to detect call quality and bandwidth problems and to determine the particular customer sites where those problems are occurring. Trouble tickets or other process flow mechanisms may be issued to trigger repair or maintenance actions based on detecting the problems. A VoIP call reporting system 180 also receives the CDRs and associated customer site identifiers and uses that information to provide call statistics or billing information per customer site 130, 140. In embodiments, those call statistics may be presented to a network troubleshooter using a graphical user interface.

Figure 2:
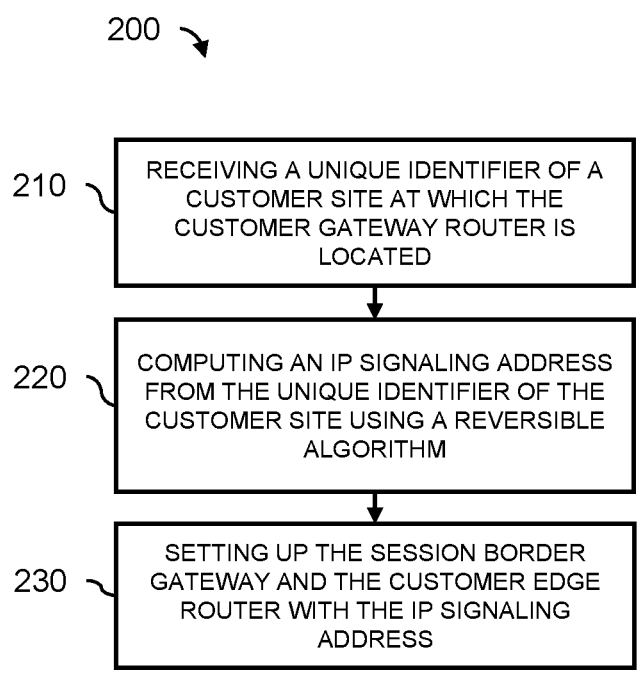
FIG. 2 is a flow diagram showing a method in accordance with aspects of the present disclosure.

With reference to FIG. 2, a method 200 is now described for provisioning a link between a session border gateway and a customer gateway router in a voice-over-IP communications network. At operation 210, a provisioning system of a VoIP network initially receives a unique identifier of a customer site at which the customer gateway router is located. The unique identifier of the customer site may be a 9-digit number generated by the voice-over-IP provisioning system of the voice-over-IP communications network. The customer site may be an originating site or a terminating site. Identifiers may be received for both sites.

The provisioning system computes at operation 220 an IP signaling address such as an IPv6 signaling address from the unique identifier of the customer site, using a reversible algorithm. The reversible algorithm may, for example, contain only string operations and conversion between numeral systems having different bases. The reversible algorithm may be performed without reference to a lookup table.

The unique identifier may be a decimal number and computing the IP signaling address using the reversible algorithm may include translating the decimal number to a hexadecimal number, adding strings to the hexadecimal number to create a standard-format extended unique identifier; and prepending the extended unique identifier with an IPv6 prefix to create an IPv6 signaling address. The IPv6 prefix may identify a network provider of the voice-over-IP communications network.

The session border gateway and the customer edge router are then set up at operation 230 with the IP signaling address.

Figure 3:
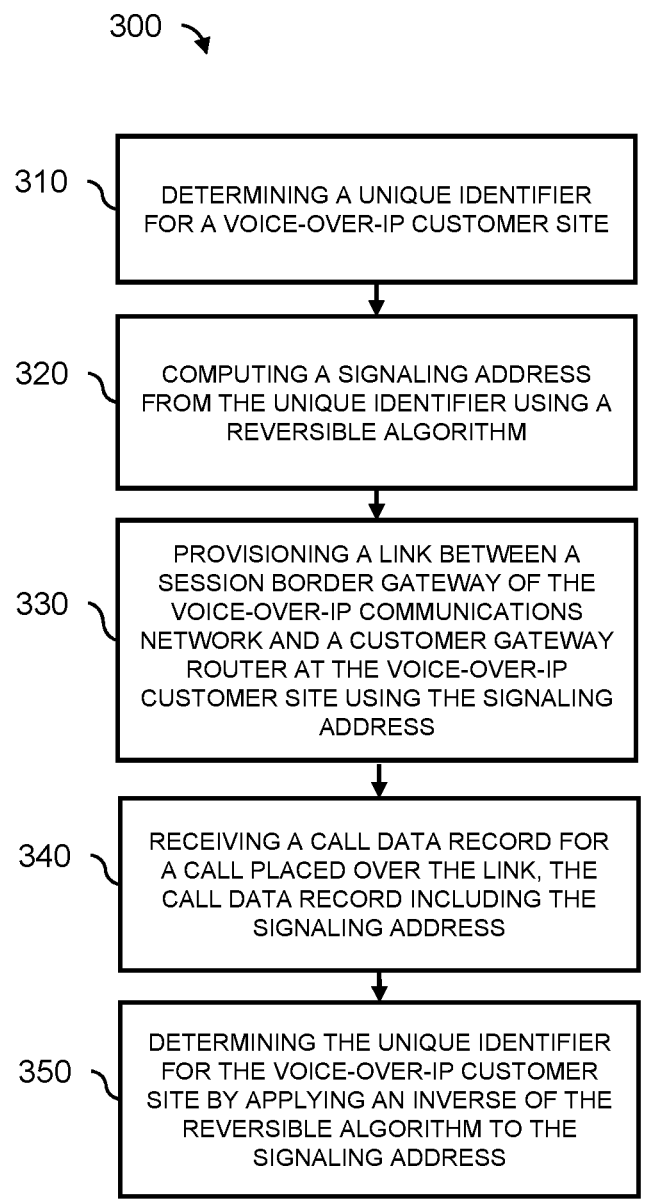
FIG. 3 is a flow diagram showing another method in accordance with additional aspects of the present disclosure.

Another method 300 is now described with reference to FIG. 3, for generating call data for a call made in a voice-over-IP communications network. At operation 310, a unique identifier is determined for a voice-over-IP customer site. The identifier may, for example, be stored in a database of the VoIP network provider and associated with the customer site.

A signaling address is computed at operation 320 from the unique identifier using a reversible algorithm. Computing the signaling address may be performed without reference to a lookup table, and may include translating a decimal number to a hexadecimal number, adding strings to the hexadecimal number to create a standard-format extended unique identifier, and prepending the extended unique identifier with an IPv6 prefix to create a unique IPv6 signaling address.

A link is then provisioned at operation 330 between a session border gateway of the voice-over-IP communications network and a customer gateway router at the voice-over-IP customer site using the signaling address.

A call data record is received at operation 340 for a call placed over the link. The call data record includes the signaling address. The unique identifier for the voice-over-IP customer site is determined at operation 350 by applying an inverse of the reversible algorithm to the signaling address. Call quality metrics and call problems may be associated with the voice-over-IP customer site.

In sum, the present disclosure provides a method for translating a customer site identifier into a unique IP signaling address (for routing VoIP calls) and vice versa. Example algorithms for mapping the customer site identifier to a unique IPv6 signaling address and vice versa are presented. The disclosure furthermore provides a technique for uniquely identifying the user's call source and destination locations in the call data record for call quality or calling problems by using an IPv6 signaling address that maps to a customer site identification code. Finally the disclosed solution provides a way to provision the IPv6 signaling address in the VoIP service instruments both in the core network as well as the customer premises for initializing the call flow and capturing the call statistics in the CDR using the IPv6 signaling address as a signature of the source and the destination of the call.

The solution provides several important benefits for service providers that use dynamic IP addresses for end user devices. The solution provides a simple way to uniquely identify the source and the destination locations in a CDR for each call session. The solution only requires a compact routine or calculator to convert the customer site identifier to the IPv6 signaling address in the service design and provisioning step of the customer's VoIP service.

The solution furthermore leverages the existing provisioning flow to set up the IPv6 signaling address for both the VOIP core network and the customer's gateway router without any additional changes. For CDR processing and reporting, a calculator can easily be added to convert the IPv6 signaling IP address to the customer site identifier in the existing CDR processing and reporting application with no further change required.

The hardware and the various network elements used in implementing the above-described processes and systems comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements also includes memory that functions as a data memory that stores data used during execution of programs in the processors, and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including routers, personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A voice-over-IP communications network comprising a plurality of session border gateways, each session border gateway comprising an interface for connection to a customer edge router of a customer site, each session border gateway being connected to a provisioning system comprising a processor and a computer readable storage device having computer readable instructions stored thereon that, when executed by the processor, cause the processor to perform operations comprising:
   (a) retrieving from a provisioning database a customer site identifier identifying the customer site;
   (b) converting the customer site identifier to an IPv6 signaling address, the IPv6 signaling address containing information from which is derivable the customer site identifier without reference to a lookup table, wherein converting the customer site identifier to an IPv6 signaling address further comprises:
      translating a decimal number identifying the customer site to a hexadecimal number;
      adding strings to the hexadecimal number to create a standard-format extended unique identifier; and
      prepending the extended unique identifier with an IPv6 prefix to create the IPv6 signaling address; and
   (c) provisioning a voice-over-IP connection between the session border gateway and the customer edge router using the IPv6 signaling address.

2. The voice-over-IP communications network of claim 1, wherein the IPv6 signaling address is reversibly derivable from the customer site identifier using an algorithm containing only string operations and conversion between number systems having different bases.

3. The voice-over-IP communications network of claim 1, wherein the IPv6 prefix identifies a network provider of the voice-over-IP communications network.

4. The voice-over-IP communications network of claim 1, wherein the decimal number identifying the customer site is a 9-digit number generated by the provisioning system.

5. The voice-over-IP communications network of claim 1, further comprising:
   a call data record processing system including a processor and a computer readable storage device having computer readable instructions stored thereon that, when executed by the processor, cause the processor to perform operations comprising:
      receiving a call data record associated with the voice-over-IP connection between the session border gateway and the customer edge router, the call data record including call quality metrics associated with the voice-over-IP connection and further including the IPv6 signaling address;
      deriving the customer site identifier from the IPv6 signaling address; and
      associating the call quality metrics with the customer site.

6. The voice-over-IP communications network of claim 5, the operations further comprising:
   presenting the call quality metrics per customer site via a graphical user interface.

7. The voice-over-IP communications network of claim 1, wherein the IPv6 signaling address is generated from the customer site identifier using a reversible algorithm.

8. A method for provisioning a voice-over-IP connection between a session border gateway and a customer edge router in a voice-over-IP communications network, comprising:
- by a provisioning system, receiving a customer site identifier of a customer site at which the customer edge router is located, the customer site identifier being a decimal number uniquely identifying the customer site via a provisioning database;
- by the provisioning system, computing an IPv6 signaling address from the customer site identifier of the customer site using a reversible algorithm, the reversible algorithm comprising:
  - translating the decimal number to a hexadecimal number;
  - adding strings to the hexadecimal number to create a standard-format extended unique identifier; and
  - prepending the extended unique identifier with an IPv6 prefix to create the IPv6 signaling address; and
- by the provisioning system, establishing the voice-over-IP connection between the session border gateway and the customer edge router using the IP signaling address, wherein a call data record created for the voice-over-IP connection includes the IP signaling address, the customer site identifier being derivable from the IP signaling address by applying an inverse of the reversible algorithm.

9. The method of claim 8, wherein:
the reversible algorithm contains only string operations and conversion between number systems having different bases.

10. The method of claim 8, wherein the IPv6 prefix identifies a network provider of the voice-over-IP communications network.

11. The method of claim 8, wherein computing the IP signaling address from the customer site identifier using a reversible algorithm further comprises computing the signaling address without reference to a lookup table.

12. The method of claim 8, wherein the customer site identifier of the customer site is a 9-digit number generated by the provisioning system.

13. A method for generating call data for a call made in a voice-over-IP communications network, comprising:
- by a provisioning system, determining a customer site identifier for a voice-over-IP customer site, the customer site identifier being a decimal number uniquely identifying the customer site via a provisioning database;
- by the provisioning system, computing a signaling address from the customer site identifier using a reversible algorithm, the reversible algorithm comprising:
  - translating the decimal number to a hexadecimal number;
  - adding strings to hexadecimal number to create a standard-format extended unique identifier; and
  - prepending the extended unique identifier with an IPv6 prefix to create a unique IPv6 signaling address;
- by the provisioning system, provisioning a link between a session border gateway of the voice-over-IP communications network and a customer edge router at the voice-over-IP customer site using the signaling address;
- by a call data record processing system, receiving a call data record for a call placed over the link, the call data record including the signaling address; and
- by the call data record processing system, determining the customer site identifier for the voice-over-IP customer site by applying an inverse of the reversible algorithm to the signaling address.

14. The method of claim 13, wherein the IPv6 prefix identifies a network provider of the voice-over-IP communications network.

15. The method of claim 13, wherein computing a signaling address from the customer site identifier using a reversible algorithm further comprises computing the signaling address without reference to a lookup table.

16. The method of claim 13, further comprising:
associating call quality metrics and call problems with the voice-over-IP customer site.

\* \* \* \* \*